(Model.) 8 Sheets—Sheet 1.

W. N. WHITELEY & W. BAYLEY.
HARVESTER AND BINDER.

No. 500,175. Patented June 27, 1893.

(Model.)  3 Sheets—Sheet 5.
W. N. WHITELEY & W. BAYLEY.
HARVESTER AND BINDER.
No. 500,175.  Patented June 27, 1893.
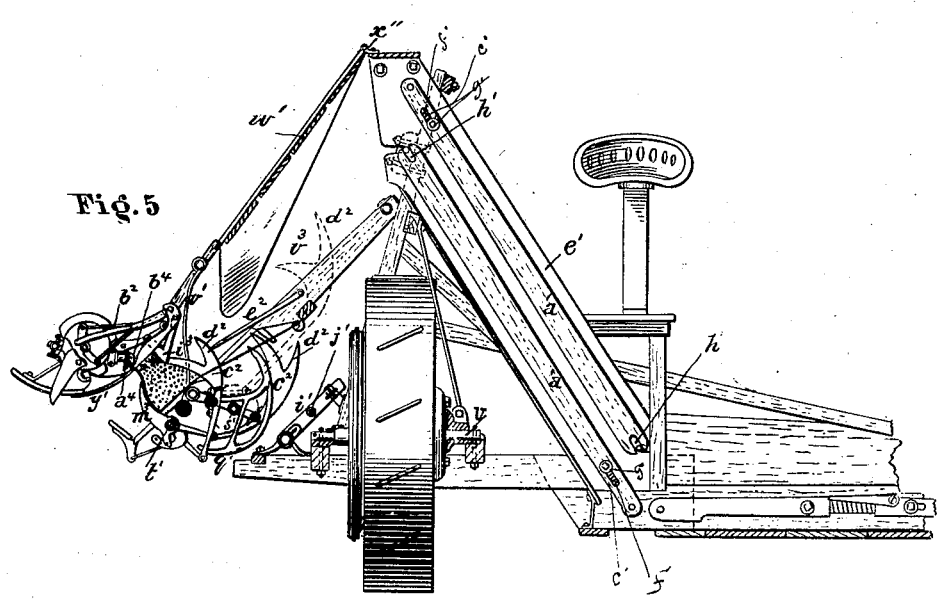
Fig. 5
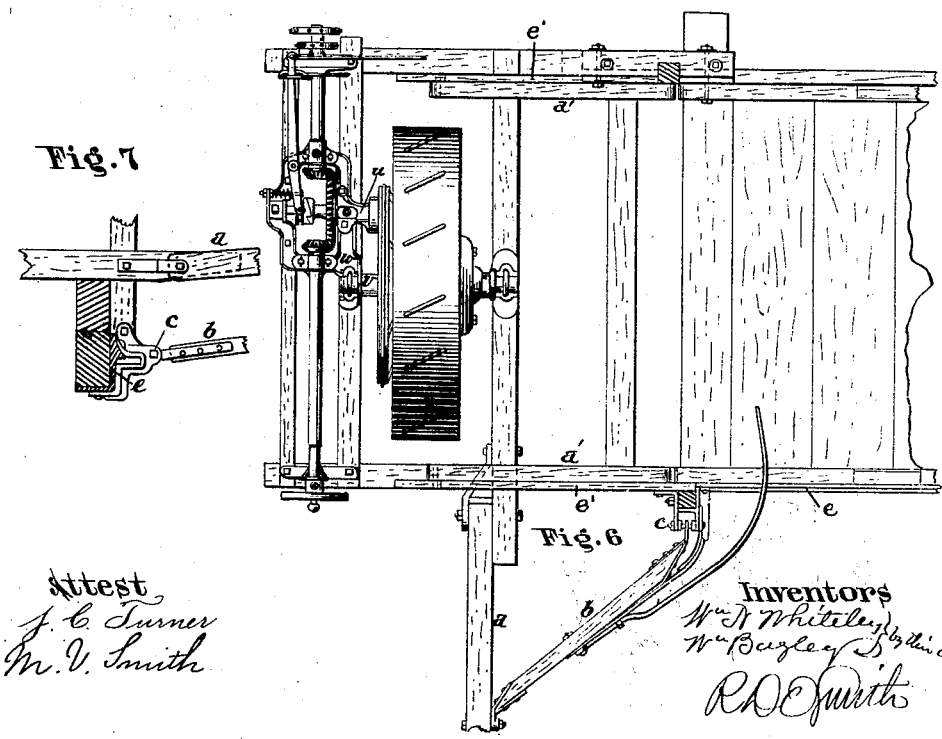
Fig. 7
Fig. 6
Attest
J. C. Turner
M. V. Smith
Inventors
W. N. Whiteley
W. Bayley by their atty
R. D. Smith

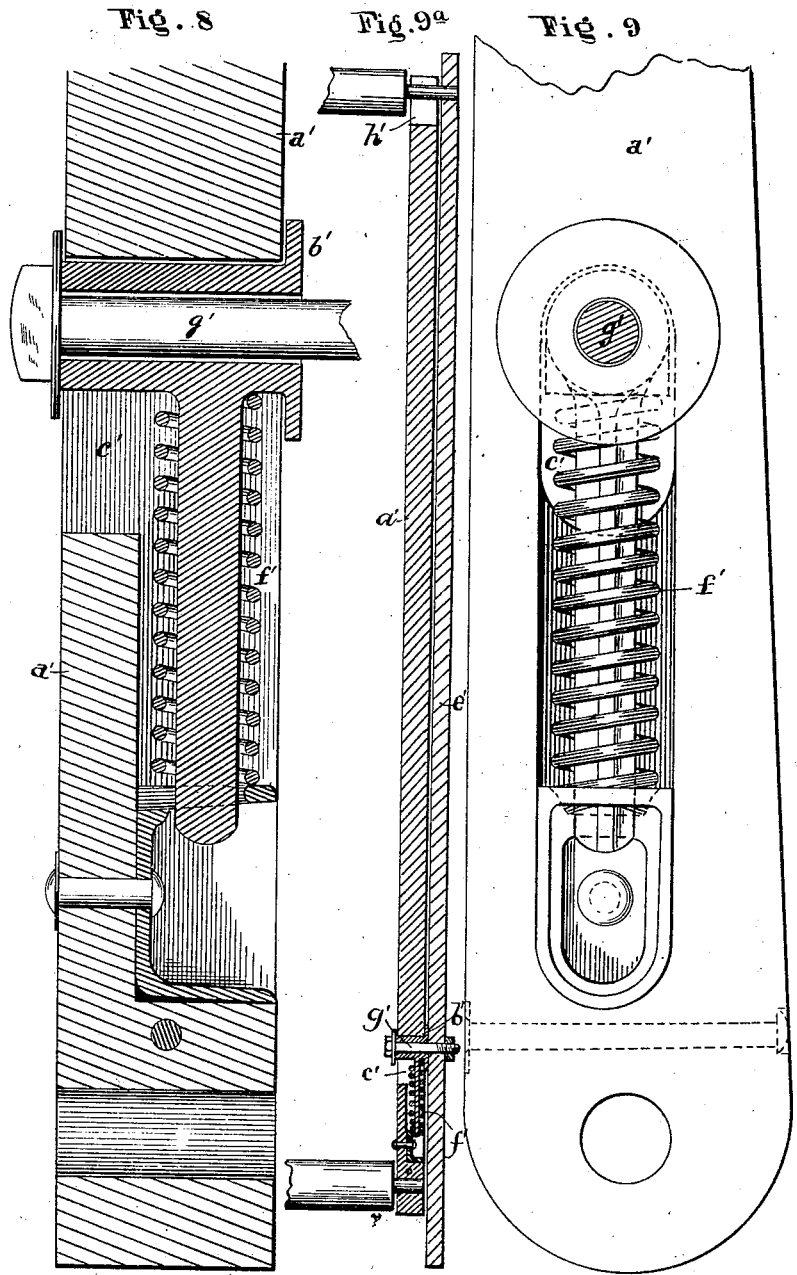

(Model.)   8 Sheets—Sheet 7.
W. N. WHITELEY & W. BAYLEY.
HARVESTER AND BINDER.
No. 500,175.   Patented June 27, 1893.
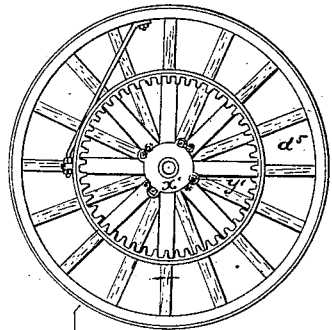
Fig. 10
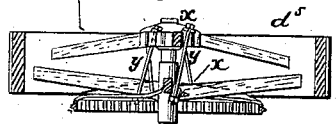
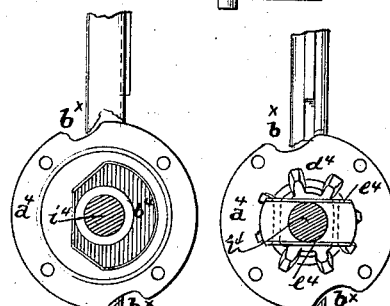
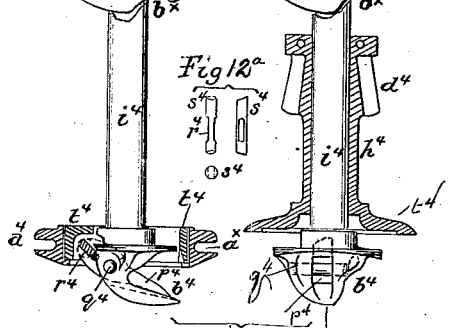
Fig. 12   Fig. 13
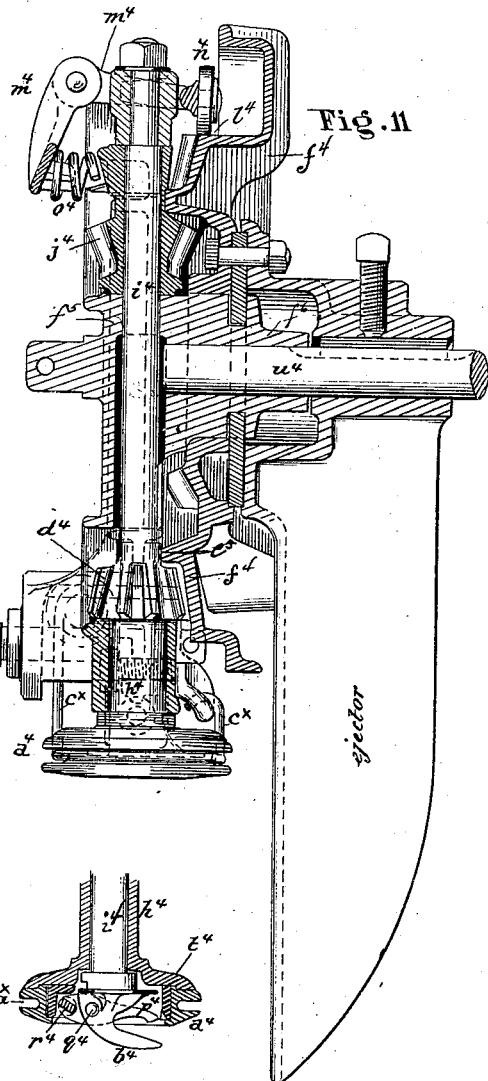
Fig. 11
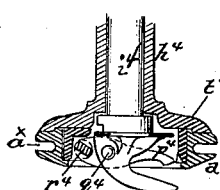
Fig. 12ª
Attest
J. C. Turner
M. V. Smith
Inventors
Wm. N. Whiteley
Wm. Bayley
by their atty
R. W. O. Smith

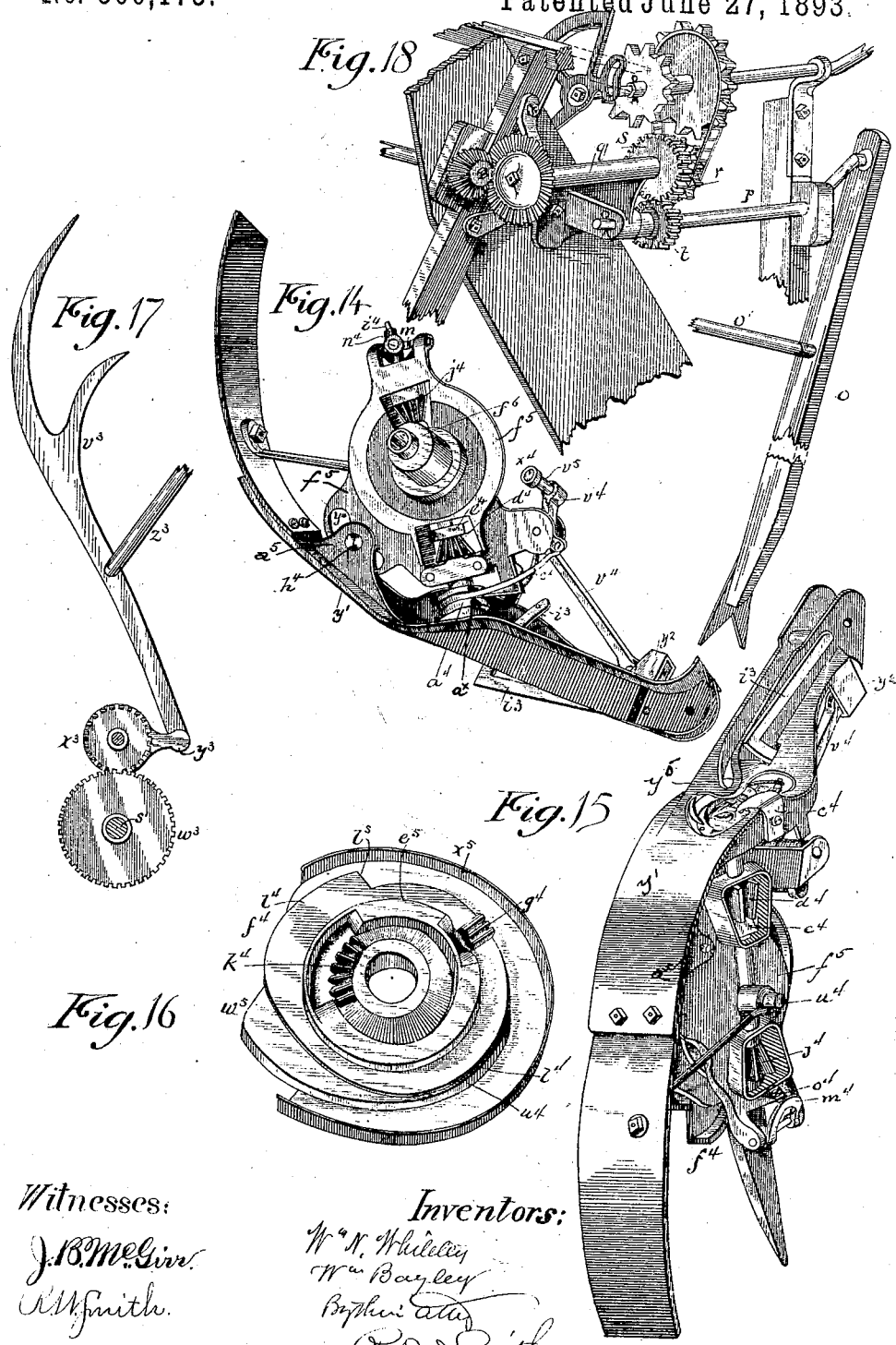

UNITED STATES PATENT OFFICE.

WILLIAM N. WHITELEY AND WILLIAM BAYLEY, OF SPRINGFIELD, OHIO, ASSIGNORS TO WHITELEY, FASSLER & KELLY, OF SAME PLACE.

HARVESTER AND BINDER.

SPECIFICATION forming part of Letters Patent No. 500,175, dated June 27, 1893.

Application filed May 23, 1882. Serial No. 62,204. (Model.)

*To all whom it may concern:*

Be it known that we, WILLIAM N. WHITELEY and WILLIAM BAYLEY, of Springfield, county of Clark, State of Ohio, have invented a new and useful Improvement in Harvesters and Binders, of which the following is a specification.

Figure 1:
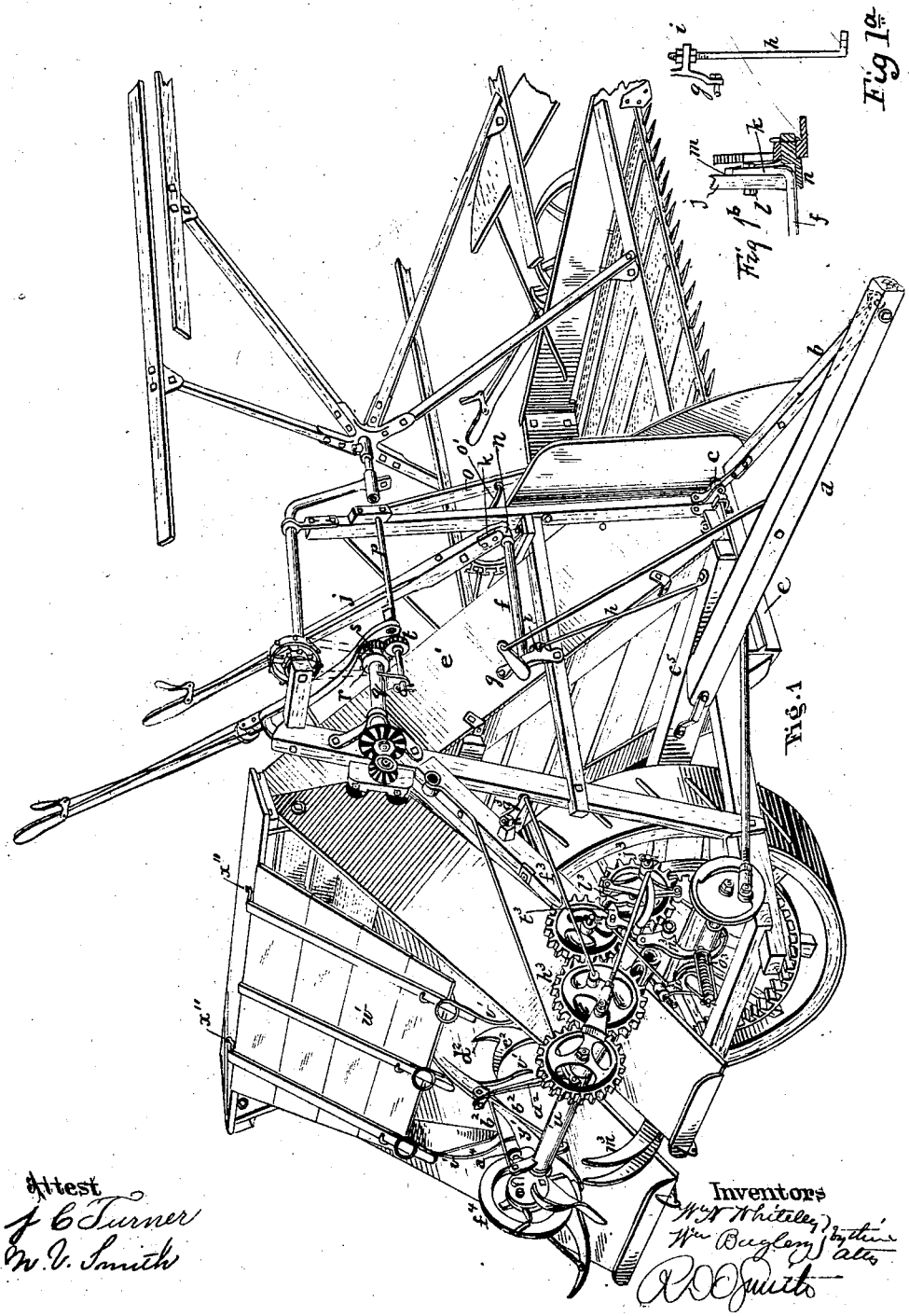
Figure 2:
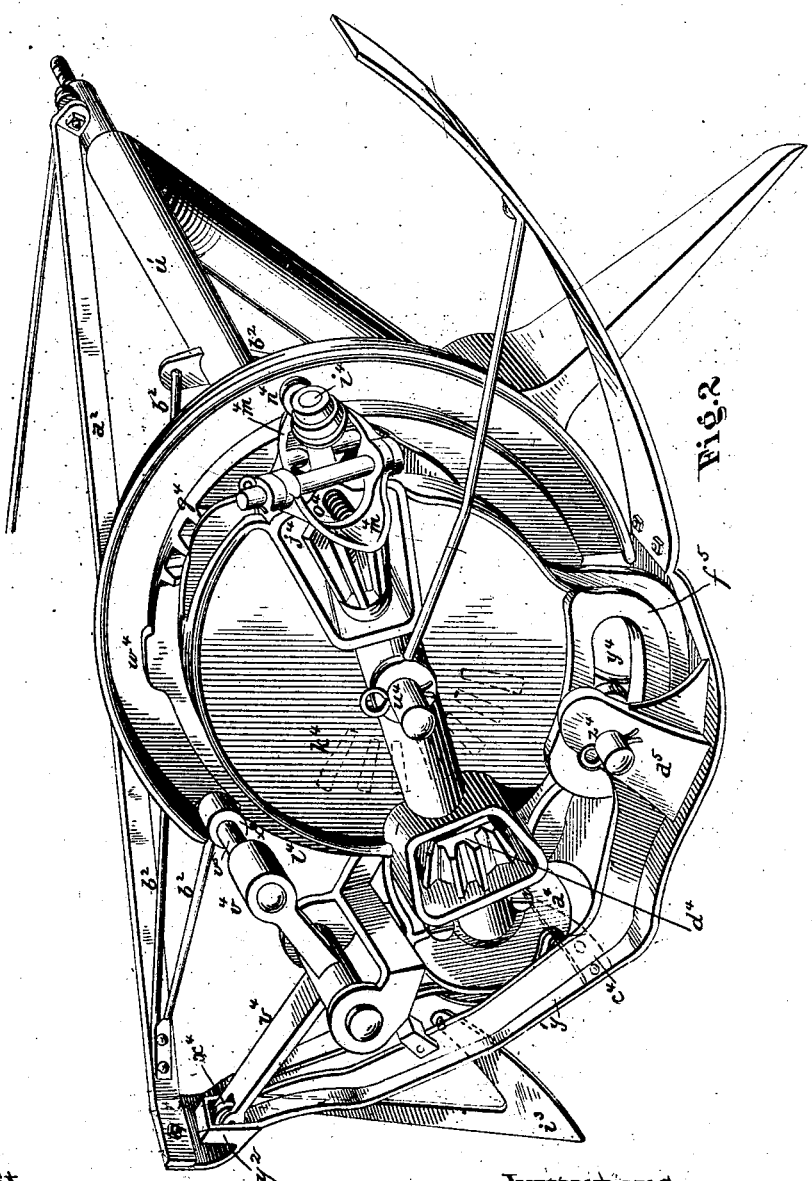
Figure 3:
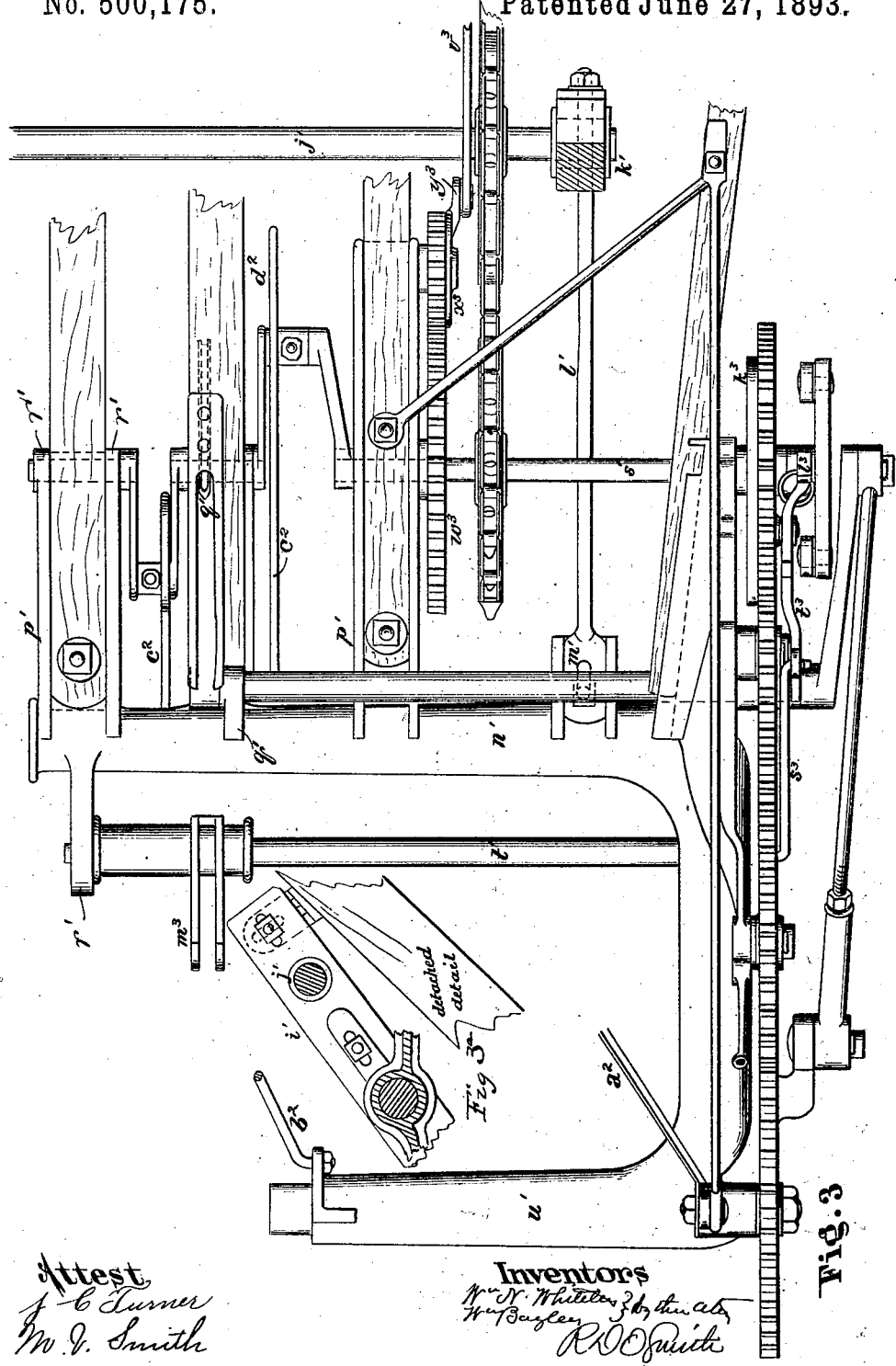
Figure 4:
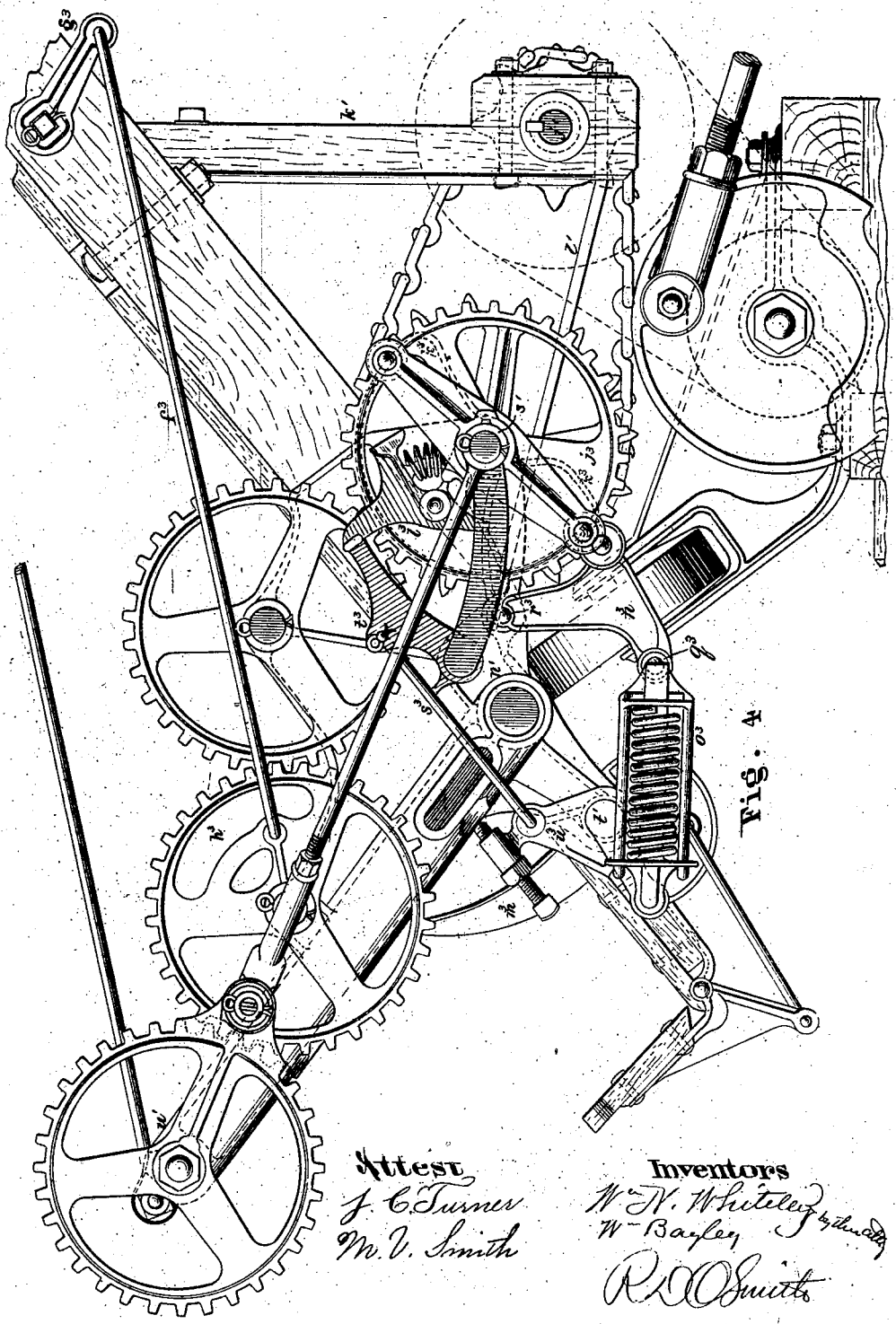

In the accompanying drawings Figure 1 is a perspective view of a combined harvesting and binding machine embodying our invention. Fig. 1$^a$ is an elevation of the front brace of the elevator frame. Fig. 1$^b$ is a vertical section of the socket coupling for the tongue lever rock shaft. Fig. 2 is a perspective view of our improved knot-tying device. Fig. 3 is a partial plan view of the binding mechanism detached. Fig. 3$^a$ is an enlarged detail of the adjustable link support for the binder shaft extension. Fig. 4 is an end elevation of a binding machine embodying our improvements as attached to a harvesting machine which is only partly shown. Fig. 5 is a transverse section through a binding and harvesting machine embodying our improvements, only so much of the harvesting machine being shown as would best elucidate the invention. Fig. 6 is a plan view of the same. Fig. 7 is a detail of the jointed tongue brace. Fig. 8 is a section through one end of one of the arms of the elevator belt frame showing our improved manner of adjusting for expansion and contraction of belts. Fig. 9 is an elevation of the same. Fig. 9$^a$ is a sectional view similar to Fig. 8, and showing also the side frame of the elevator and portions of the rollers. Fig. 10 comprises two drawings of the master-wheel representing a wheel with staggered spokes capable of being drawn toward each other by means of screw-bolts placed obliquely to the line of the axle in order that they may pass between rather than through the spokes. Fig. 11 is a diametrical section through our knot-tying device. Fig. 12 shows a detail of the knotter. Fig. 12$^a$ shows three views of the pin $s^4$. Fig. 13 is a section of the knotter its jaws being open to receive the ends of the band in order that the loop may be slipped around them to form the knot. Fig. 14 is a perspective view, from the front side, of the knotting mechanism and breast plate, detached, the main knotter-operating wheel or cam disk being removed. Fig. 15 is a perspective view of the same parts, from the under side. Fig. 16 is a perspective view, enlarged, of the knotter-operating wheel or cam disk $f^1$. Fig. 17 is a detail view illustrating the mechanism for driving the butts packer $v^3$. Fig. 18 is a detached perspective view, enlarged, of the mechanism for driving the butts rake $o$.

Our invention relates to harvesters that elevate the grain over the master wheel and deliver it to a self-binder that compresses the grain into sheaves of uniform size, encircles the sheaves with a cord the ends of which it securely ties and then ejects said sheaves to the ground, and it consists first in the combination of devices for automatically cutting elevating and delivering grain to a binding table, second in the construction and combination of devices for automatically binding grain.

To enable others skilled in the art to make and use our invention we have illustrated it as attached to a combined machine embodying improvements for which previous patents have been obtained and others for which applications have been made. Such we do not claim in this application although we deem it advisable to show them connected with this improvement as we may have to refer to them in describing the construction and operation of the same which we will now proceed to do.

Harvester tongues have been secured to the sill of the harvester in a manner resembling ours but having a rigid brace extending from the side of the tongue to the front of the shoe, the joint of said tongue to the frame and the joint of the brace to the shoe were on the same axial line, to insure their working in harmony during the tilting of the machine, and the sill being necessarily at some height above the knife the joint of the brace and the shoe itself had to be elevated accordingly. The shoe was secured to the lower part of the finger bar under the knife causing it to project therefrom and necessitating its being made very heavy. To obviate these difficulties we have constructed a tongue $a$ with a jointed brace $b$ which is free to adjust itself to any line the tongue may assume and have its joint $c$ with the shoe $d$ placed on a line with the finger bar $e$. The shoe is connected with the finger bar above and below the knife thereby forming a direct line of draft from the tongue to the finger bar.

It is customary to support the shaft $f$ for tilting the machine from a bracket $g$ bolted to the front side board of the elevator frame and a brace $h$ is used to connect the tongue sill to said bracket, said bolt being of a fixed length and the variations in the parts in manufacturing necessitated an adjustment to tighten the rod up and prevent the surging of the machine from springing the side board in and thus interfering with the proper working of the elevator belts. To obviate this we have constructed an adjustable brace passing freely through the eye $i$ of the bracket $g$ and fitted with two lock nuts one above and one below said eye as shown in Fig. 1$^a$. We attach the tilt lever $j$ to the shaft $f$ by turning the shaft up at right angles as at $k$ and then putting a bolt $l$ through both the lever and bent end of said shaft, the bent lever fitting into an extension $m$ of a socket $n$ that forms one of the journals upon which the shaft $f$ oscillates. See Fig. 1$^b$.

To simplify the construction of the gearing for driving the butts rake $o$ we give the end of the shaft $p$ a bearing in a projection on the box $q$ that carries the shaft having on its inner end the reel driving sprocket wheel $r$ and the gear $s$ which latter drives the butts rake. The gear $s$ meshes with a gear $t$ fast to the shaft $p$ which is cranked at its end, the butts rake being mounted on said cranked portion, and controlled and directed in its movements by a link $o'$ connecting it with some fixed part of the main or elevator frame, see Fig. 18.

Gear frames have been made of one piece and the master wheel box of another making a liability to change of distance between the counter shaft $u$ and the master-wheel shaft $v$ in the event of the bolts that secure them to the sill, becoming loose through the jarring of the machine and disengage the counter shaft pinion from the gear on the main wheel. To obviate this we have extended the gear frame $w$ and made it receive both shafts thereby preserving the distance between the shafts $u$ $v$.

In manufacturing master-wheels of the class illustrated by Fig. 10 of the drawings, wherein the draw bolts run from the spokes on one hub through those on the other, when the spokes were thus bored to allow the bolts to be put through, they were weakened so much, at times, that the wood was battered up or upset and the holes closed and the wheel would have to be taken apart to put in new spokes. To obviate this we have made the hubs $x$ $x'$ to receive the draw bolts $y$ at an angle as shown by Fig. 10 of drawings. The bolts, thus arranged, serve the purpose of strongly connecting the hubs and relieving the spokes of strain, and also prevent their being weakened as above mentioned.

Harvesters with extensible side pieces for the elevator belt frames have formerly been constructed of two parts, one piece to form the bearing for the driving roller being bolted firmly to the side board of the elevator frame and provided with a spring between its end and the contiguous end of the second piece that moved on sleeves or guides secured to the side board the movable piece being drawn up toward the driving roll by the canvas-belt and forced out by a spring said movable piece being provided with slots to permit it to slide upon the aforesaid sleeves. The springs had to be compressed to get the adjustable side pieces of the belt frames into the machine, to overcome which we have constructed a guide with a spring which can be inserted into the side board of the elevator frame or the side pieces of the belt frame; we have illustrated it as inserted into the latter (Figs. 5, 8, 9 and 9$^a$) and working against a sleeve $b'$ on which sleeve fits and slides the side piece $a'$ by means of a slot $c'$ in the side piece. A bolt $g'$ passes through the said sleeve and secures it to the side board $e'$ of the elevator. When the belts are removed the spring forces the piece $a'$ into the position shown in Figs. 8 and 9 and the bolt $g'$ can be taken out or put in as easily as though no spring were there. The aforesaid sleeve and spring are located at the end of the side piece near the driven roller while the other end of said side piece is notched as at $h'$ so that it may be free to slide on the shaft of the driven roller which has fixed bearings in the elevator frame. The one bolt $g'$ is all that is required to secure the side piece $a'$ in proper working position, by which arrangement and construction we are enabled to remove both of the driven rollers and both side pieces by the removal of two bolts. It will also be seen that this construction could be advantageously used to tighten belts of harvesters where no springs are used by making the trunnions of the driven rollers to adjust in the slots and then secure them at any desired point with the bolts $g'$.

In binders that are adjustable to suit different lengths of grain difficulty has been experienced to apply the power from the harvester to the binder in its different positions. In some cases a short shaft has been secured to the harvester and a telescopic tumbling-shaft connected it to the binder shaft. The chain connecting the harvester and binder shafts in this case had to have a tightening device applied to it. The binder-shaft has been extended in other cases until a chain could be run to it from the harvester thus causing the shaft to overhang considerably past its journals. To lessen the number of parts and make a better construction that could not be interfered with by any motion or surging of the binder or harvester we have applied a shaft $j'$ which is journaled at one end on an adjustable link $i'$ which forms a bearing for said shaft $j'$. This link $i'$ can be loosened and the shaft $j'$ moved up near to the binder shaft to put the chain on and then readjusted to its proper place to tighten the chain thus dispensing with a tightening device. We have also journaled this shaft $j'$ at its other end on a hanger $k'$, see Figs. 3 and 4, that is secured to the binder at the front end this is also provided with slots for the securing-bolts to pass through and by which an adjustment can be made or the chain tightened or removed. The shaft $j'$ is driven from the harvester crank shaft by chain gearing (Fig. 4). The brace $l'$ is also slotted at the end $m'$ for the securing-bolt to pass through and thus a horizontal adjustment of the post $k'$ is provided for, which will be understood by an examination of Figs. 3 and 4 and the enlarged detail upon the same sheet of drawings. By these means an adjustment can be made to tighten or to remove the chain. Binders of this description, provided with a U shaped frame, have been made with the lower arm $n'$ taking the binder arm shaft through it consequently the frame stopped at the binder-arm and a piece of gas pipe was bolted underneath it to which was secured the wrought iron and wooden pieces to carry the packer shaft bearings on both sides of the binder arm. This necessitated many parts and much hand fitting to get them together right. By our present invention we have dispensed with all these loose parts by carrying the lower arm of this frame through beyond the binder arm line and then securing the binder arm to a separate shaft running along on one side of the frame and running the frame through where it did not interfere with any of the working parts of the binder then forming projections $p'$ $p'$ on each side of the binder arm $q'$, to carry the bearings $r'$ $r'$ for the packer and compress shafts $s'$ and $t'$ respectively thus making all of the working parts of any importance secure to the one binder frame $n'$ $n'$.

It is customary to secure a wooden cross-tie above the binding mechanism to which was secured a spring grain retainer on each side of the binding arm $q'$. We have dispensed with the use of the cross-tie by securing the spring grain retainers $v'$ $v'$ $v'$ to a hinged deflector $w'$, said deflector being hinged to the top of the elevator frame at $x''$ $x''$.

To support the bridge or breast plate $y'$ that underlies the knotting mechanism and confines the grain from escape in an upward direction during the operation of the binding mechanism upon it we use a brace $a^2$ that stretches directly from the breast plate $y'$ to the front upper corner of the U frame and a forked brace $b^2$ $b^2$ running to the breast plate from the U frame at a point near the plane of the binder arm, which construction and arrangement make a much stronger support for the breast plate $y'$ against the upward thrust of the packers and binder arm in making a division of the grain. The breast plate has a slot $y^5$ which terminates under the center of the knotter hook when the latter is in its tying position, and which serves as a cord guide to hold the cord on the hook during the revolution of the same. It also carries the knife hereinafter described.

To successfully bring down tangled grain is one of the most difficult duties a binder has to perform, and in a binder where the packers $c^2$ run continuously as in the present machine it has been thought best heretofore to make the rear prongs of the packers short to keep them from pulling the grain around the back of the cord arm, and when they are so arranged they become of little use as packers and act more as agitators, but when instead of this the rear prongs $d^2$ of the packers are prominent they are very effective in bringing down tangled grain and they may be so constructed if the grain is lifted out of their reach while the binding of a sheaf is in progress. Heretofore we have devised the separator $e^2$ operated positively both ways by the agency of a connecting rod $f^3$ joined at one end to a crank $g^3$ that forms a part of the rod upon which the separator is secured and at the other end to the gear wheel $h^3$ in the manner shown by Figs. 1 and 4 by which arrangement the point of the binder arm can be left sharp to better pierce the grain. After the grain has been brought down as far as the packers will take it is is disposed to spring back after the retiring packer and thus interfere with the operation of the packers. To partially obviate this we have applied a stop $i^3$ that is pivoted to and hangs from the bridge $y'$. This stop $i^3$ is hinged to the breast plate $y'$ and may be forced down by a spring or drop by its own gravity to hold the grain from springing back and will lift to permit the grain to pass under it.

Binders have been made and arranged for the packer shaft to run continuous and carry a dog that at certain times engages with a pawl on a pinion which was fitted to said shaft so as to permit the shaft to run loosely therein and forming part of the binder driving train and when the pawl was depressed the dog on the packer shaft passed over the pawl on the pinion and the binder remained at rest. This pinion was generally small and made several revolutions for each operation of the binder. We have made the whole train of gearing the same size so that the wheel $j^3$ which takes the place of the pinion in the old construction becomes the main binder drive wheel in our improved machine as it carries in addition to the track $k^3$, shown in dotted lines in Fig. 4 the customary pawl $l^3$ that serves to lock the wheel $j^3$ to the packer shaft and thus connect the binding machinery to the harvesting machinery. The track $k^3$ operates the trip finger $m^3$ through the agency of the bell crank $n^3$ pivoted on the frame and the intermediate spring connection $o^3$ that is firmly attached at one end to the shaft $t'$ that carries the said trip finger and at the other to the bell crank at $g^3$ while the friction roller $i^3$ on the bell crank rides on the cam track $k^3$. The trip finger in order to start the machine is connected with the pawl $l^3$ by means of a rod $s^3$, a pivoted bent lever $t^3$ and the pivoted lever $u^3$ fast to the trip finger shaft.

With our present improvement where all of the parts make but one revolution the lever $t^3$ can be coupled direct to the shaft of the trip fingers as it cannot get into the path of the pawl until the revolution of the machine is complete.

In elevating soft wet grain it is not delivered into the binder in the same manner as dry grain which falls on the table in reach of the packers while the damp grain rolls over the lower elevator belt in a sluggish manner and the slats on the belt are disposed to carry it down between the belt and the binding table and oftentimes retards the descent of grain into the binder. This trouble is almost entirely at the butts end of the elevator and to obviate this we formerly used a butts packer driven from the usual packer shaft in which position we could not reach the desired point so in this improvement we operate the butts packer $v^3$ by a pair of gear wheels $w^3$ $x^3$ the one $w^3$ being secured to the usual packer shaft $s'$ while the one $x^3$ is provided with a crank $y^3$ connected to one end of the packer $v^3$ which is suspended somewhere near its mid length by an oscillating link $z^3$ one end being pivoted to the frame and the other to the packer for detail of which see enlarged view Fig. 17. It will be seen that by this construction we are capable of reaching near the belt and by properly arranging the relative sizes of the gear wheels to run at any desired speed.

All binders, so far as we are advised, have been made so that when the binder arm encircles the straw with the band it lays it first on the knotter and passing still farther lays it into a holding device of some kind which necessitated the making of the binder arm point very long to stretch past the holder sufficiently to allow for spring when compressing a large sheaf, or the binder arm would spring back and not deposit the cord in the holder. We have improved this construction by arranging a holder that takes a grip on the cord before it is laid on the tyer and at a point where it is always sure to get it. The holder $a^4$ is arranged and operated so that it lays the cord on the tyer $b^4$ by revolving around it, on the same center as the tyer, in one direction while the tyer advances to meet it in the other direction. We have also arranged the tyer $b^4$ and holder $a^4$ to lie close to the breast plate $y'$ which leaves nothing between the sheaf and tying device but the thin sheet metal breast plate $y'$ by which means we not only get close to the sheaf with the tyer but use the breast plate as a stripper by imparting to the tyer and holder an oscillating movement around the tyer shaft as hereinafter described as the sheaf is being ejected, and by holding the ends of the band against an enlarged surface on the breast plate while the knot was stripped by the movement of the tyer, while the same movement of the tyer and holder severs the cord between the tyer and holder by passing a stationary knife $c^4$ secured to the breast plate $y'$.

The holder $a^4$ is driven by a bevel pinion $d^4$ having eight teeth and which is also provided with two flat sides $e^4$ that rest upon the flat face of the disk $f^4$ which has three teeth $g^4$ that operate said pinion one half of a revolution at a time after which said pinion is held to the desired position by one of the flat sides $e^4$ riding on a ridge $e^5$ formed on the disk $f^4$. The holder $a^4$ and pinion $b^4$ form a sleeve $h^4$ through which the spindle $i^4$ revolves and has a longitudinally sliding movement. The spindle $i^4$ is revolved once around by a pinion $j^4$ having eight teeth operated by the seven teeth $k^4$ formed on the side face of the disk $f^4$ said pinion being provided with the usual delay shoe to hold it in place at the end of each revolution. The spindle $i^4$ receives its sliding movement from a peripheral cam $l^4$ formed on the disk $f^4$, a bell crank lever $m^4$ which straddles said spindle so as to move with it and a friction roller $n^4$ attached to the lever $m^4$ and riding over said cam $l^4$. After the cam $l^4$ passes said friction roller a spring $o^4$ acting on the other arm of said lever returns the lever $m^4$ and spindle $i^4$ to their normal positions. The sleeve $h^4$ and the spindle $i^4$ are mounted in bearings formed in a frame or plate $f^5$ which lies against the cam face of disk or wheel $f^4$, and is supported upon the end of the shaft passing through the tubular arm $u'$ of the binder frame, this plate being provided with a central hub or boss $f^6$ (see Fig. 14) which is perforated or recessed to receive said shaft. This plate is connected with the breast plate, and has a limited movement relatively thereto around said shaft, for a purpose and in a manner to be described. The jaw $p^4$ of the tyer $b^4$ is pivoted to said tyer at $q^4$ and is bifurcated at one end to straddle and slide upon the flat portion $r^4$ of a pin $s^4$ that is pivoted in a ring $t^4$ surrounding the spindle $i^4$, and lying inside the holder $a^4$,—where it revolves with the spindle, but does not have imparted thereto the longitudinal movement of the latter. When the spindle $i^4$ revolves this ring and tyer revolve with it and when said spindle is raised by the cam $l^4$ the jaw will open as shown at Fig. 13 and enter the interior of the ring $t^4$ and will thus be sure to receive the ends of the band between itself and the hook $b^4$ for the completion of the knot which has been partly formed around the shank of the hook $b^4$ after which the band is cut between the holder and tyer by a stationary knife $c^4$ by the whole tying device oscillating upon the spindle $u^4$ through the agency of the bell crank $v^4$ riding over a cam $w^4$. Said bell crank is pivoted to the plate $f^5$ and has a friction roller $x^4$ mounted on the longer inward extending arm thereof that rides over a portion of the breast plate $y'$, the breast plate being provided with a stop $y^2$, of any preferred character, to limit the upward movement of said roller and arm as is clearly shown by Figs. 2, 14 and 15. The plate $f^5$ is slotted at $y^4$, to limit the oscillatory movement of said plate, and a pin $h^4$ passing through ears $a^5$, formed upon the breast plate $y'$, also passes through the slot $y^4$. The cams $l^4$ $w^4$ are not in line with each other and therefore do not interfere.

We will now describe the operation of the knotting mechanism: the cut grain, being carried down by the packers, is forced against the trip fingers $m^3$ until a sufficient amount has collected to set off the knotting mechanism. While the needle arm is being brought up to surround the gavel, the parts of the knotter remain inactive, except the wheel $f^4$, which has in the mean time been turning, bringing the gear $g^4$ toward pinion $d^4$. As the needle completely encircles the grain it delivers the cord to the holder $a^4$,—a spring $c^x$ carried by plate $f^5$ and lying in a peripheral groove in the holder, assisting the needle in properly directing the cord to the holder, and also assisting in confining it therein, the edge of the holder being notched as at $a^x$ to insure against the cord slipping as it is being carried to the tyer. As soon as the cord has been properly placed in the holder, and while the needle is yet moving forward, the gear $g^4$ engages the pinion $d^4$ and causes it and the holder which it actuates to make a half revolution, carrying the cord downward and delivering it to the tyer. The latter begins its revolution,—being actuated by gear $k^4$ and pinion $j^4$ in a direction opposite to the holder $a^4$,—very shortly after the same starts. At about the time the pinion $d^4$ becomes disengaged,—the roller $n^4$ carried by bell-crank lever $m^4$,—which, until now had been traveling in contact with the concentric portion of cam-track $l^4$,—is engaged by the elevated portion of said cam-track, which not only rocks said lever on its fulcrum and compresses spring $o^4$, but also slides the spindle $i^4$ longitudinally in its bearings, whereby the jaw $p^4$ is caused to open so as to grasp the cord to complete the knot. A further movement of wheel $f^4$ carries the gear $k^4$ past pinion $j^4$ completing the revolution of the tyer; at the same time the abrupt portion $l^5$ of cam-track $l^4$ is brought opposite roller $n^4$, and simultaneously the roller carried by the shorter cranked arm $v^5$ of bell crank lever $v^4$ escapes from beneath the overhanging flange $a^5$ where it had been confined, and which had, until this time, prevented any oscillation of plate $f^5$ relatively to wheel $f^4$. These two separate relations of parts being brought about simultaneously causes the sudden oscillation of plate $f^5$ whereby the knotter is thrown upward relatively to the breast-plate and the cord severed in the manner hereinbefore referred to. The rocking of plate $f^5$ relatively to wheel $f^4$ and the breast plate, may be effected by the force of the spring $o^4$, for, as the roller $n^4$ reaches the abrupt part $l^5$ of the track $l^4$ the expansive force of the spring will cause it to move forward down said incline $l^5$ with a sudden impulse, carrying with it the spindle $i^4$ and plate $f^5$,— the motion of the latter being limited, however, by slot $y^4$ and pin $z^4$. Should the tension of the spring be insufficient to oscillate the plate to the desired extent, it will be positively rocked by reason of the roller on the cranked arm $v^5$ riding up the eccentric portion $w^5$ of the track $w^4$. After portion $w^5$ of track $w^4$ passes the roller on arm $v^5$, further forward movement of wheel $f^4$ returns plate $f^5$ to its normal position, and causes the ejector to discharge the gavel, the trip arms having been rocked out of the path of the gavel to permit ready discharge. At the time wheel $f^4$ completes its revolution and the needle has been rocked back to its farthest limit, the lever $t^3$ is brought into engagement with the pawl $l^3$, and the binding mechanism thrown out of gear.

Having thus described our invention, what we claim as new, and desire to secure by Letters Patent, is—

1. A master wheel $l^5$ constructed with staggering spokes and a contractile hub provided with draw bolts $y$ that run obliquely to the shaft of said wheel to permit the bolts $x y$ to pass between instead of through said spokes.

2. The combination with the frame, of a guide $a'$ notched at one end to slide over the shaft of the driving roller and having the slot $c'$, a sleeve $b'$ passing through said slot, the bolt $g'$ in said sleeve and securing the latter to the frame, the spring $f'$ bearing on the sleeve, and the stationary and movable rollers carried by the frame and guide, as and for the purpose set forth.

3. The combination with the side boards constituting fixed parts of the harvester, and a driving shaft and belt roller mounted therein, of side pieces $a'$ longitudinally movable on said shaft and carrying a driven shaft and belt roller, sleeves or guides $b'$ fitting in said side pieces and serving as guides for the same, and springs acting between said sleeves and side pieces, substantially as set forth.

4. A gear wheel $j^3$ mounted loosely on the constantly driven packer shaft $j'$ and carrying a pawl $l^3$ and a track $k^3$, in combination with the binding driving gears and the arm for raising and lowering the trip finger, as and for the purposes specified.

5. A knotter operating wheel provided upon its face with a radially projecting, suitably beveled rack, in combination with a swinging frame connected with the knotter operating wheel and means for oscillating said frame by the said operating wheel, and a knotter shaft journaled in said frame, said shaft having affixed to it a beveled pinion which at the proper time is engaged and rotated by the rack upon the knotter operating wheel.

6. In a knotting mechanism the combination with the knotter operating wheel of a swinging frame, a knotting bill and a cord holder mounted in said swinging frame, the disk of the cord holder being intermittingly operated always in one direction by positive moving gearing, and means for swinging said frame, whereby the desired motion is given to the cord holder disk, and the knotting bill frame is swung away from its knot forming position for the purpose of shedding the loop and is then restored to its initial position, automatically.

7. In a knot tying mechanism for grain binding machines, a swinging knotting bill suspended from the knotter wheel and arranged to be swung out from its knot-making position at the completion of each knot, combined with a lever pivoted on said swinging frame, having one end in engagement with the stationary frame and the other in engagement with a cam on the knotter operating wheel, for the purpose of withdrawing the bill from the loop, driving mechanism connecting the knotter with the main cam and gear wheel and a stationary or fixed resistance plate to hold the cord between the bound sheaf and the knotting bill.

8. The combination of the swinging frame carrying the tying bill and the cord holding device, said swinging frame and knotter operating wheel being both mounted upon the same shaft, and a positive intermittently rotating mechanism journaled upon said knotter frame and operating to turn the disk of the cord holder at proper intervals for holding and guiding the cord to the knotter mechanism.

9. A swinging frame, carrying a knotter bill and cord holder and means for swinging the same, in combination with a breast plate having a stationary knife affixed thereto located between the knotter and the holder, whereby the movement of the swinging frame in stripping the knot, will bring the cord across the knife and cut it between the holder and the knotter.

10. The combination of a knotter, a ring cord holder encircling the same and mechanism for revolving the ring and knotter in opposite directions.

In testimony whereof we have hereunto set our hands this 17th day of April, 1882.

WILLIAM N. WHITELEY.
WILLIAM BAYLEY.

Witnesses:
HENRY MILLWARD,
E. O. BOWMAN.